J. JEPSEN.
RACK.
APPLICATION FILED OCT. 27, 1908.
944,874.
Patented Dec. 28, 1909.
2 SHEETS—SHEET 1.
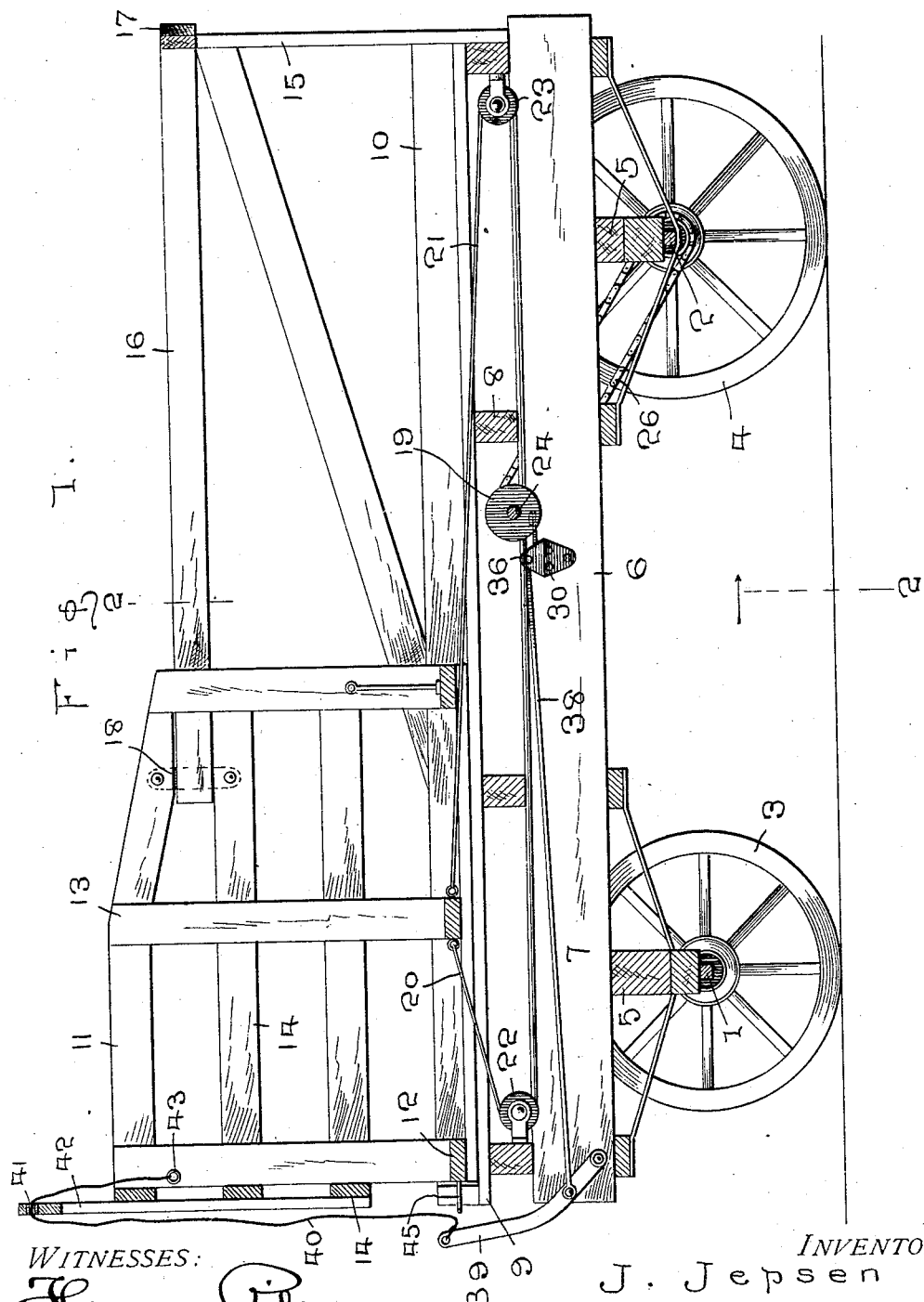
WITNESSES:
INVENTOR
J. Jepsen
BY
W. J. FitzGerald & Co.
Attorneys J. JEPSEN.
RACK.
APPLICATION FILED OCT. 27, 1908.
944,874.
Patented Dec. 28, 1909.
2 SHEETS—SHEET 2.
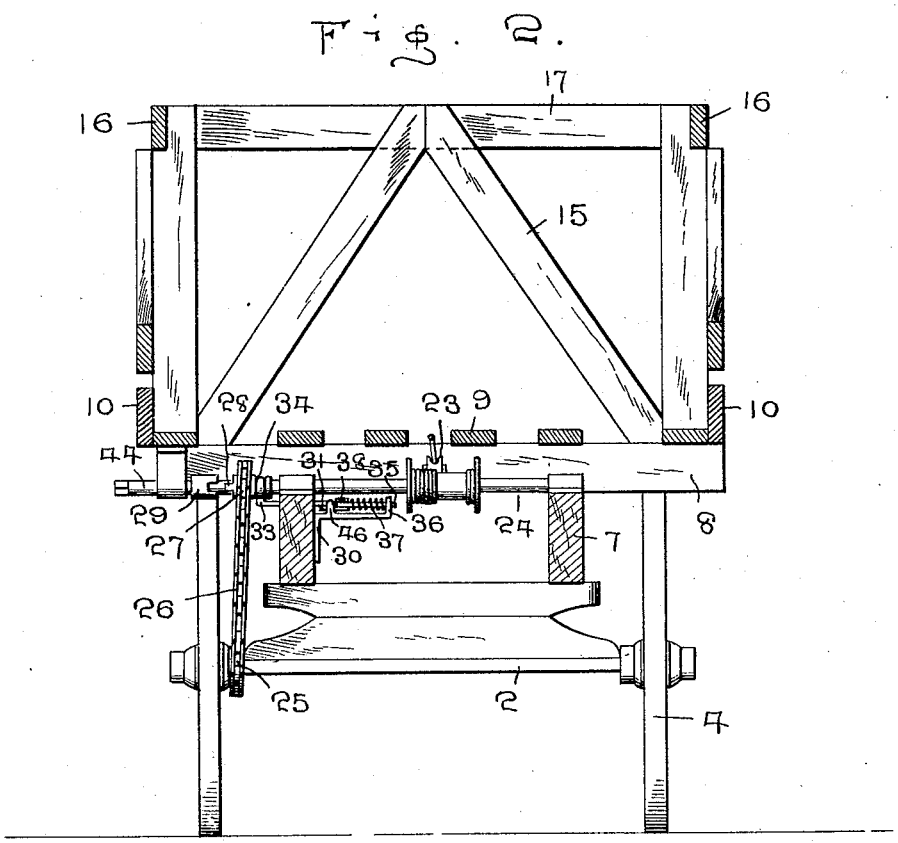
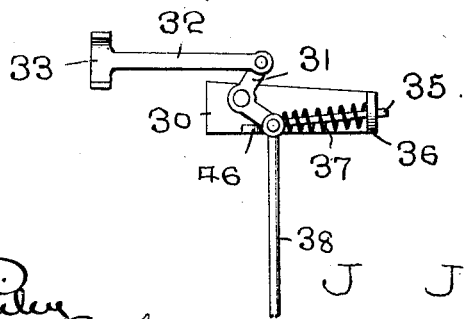
WITNESSES:
INVENTOR
J Jepsen
BY
W. J. FitzGerald & Co.
Attorneys

UNITED STATES PATENT OFFICE.

JURGEN JEPSEN, OF DENISON, IOWA.

RACK.

944,874.　　　　Specification of Letters Patent.　　Patented Dec. 28, 1909.

Application filed October 27, 1908.　Serial No. 459,725.

*To all whom it may concern:*

Be it known that I, JURGEN JEPSEN, a citizen of the United States, residing at Denison, in the county of Crawford and State of Iowa, have invented certain new and useful Improvements in Racks; and I do hereby declare the following to be a full, clear, and exact description of the invention, such as will enable others skilled in the art to which it appertains to make and use the same.

My invention relates to new and useful improvements in racks and more particularly to that class adapted to be employed for receiving and transporting hay, straw and the like and my object is to provide a movable portion for the rack which is adapted to be moved to the rear end of the rack and filled with hay and then moved to the forward end of the rack.

A further object is to provide means for utilizing the movement of the vehicle upon which the rack is placed to move the movable portion to the forward end of the rack.

A still further object is to provide means on the movable portion of the rack for automatically disconnecting the shifting mechanism from the running gears of the vehicle and a still further object is to provide means for connecting the gearing with the running gear of the vehicle.

Other objects and advantages will be hereinafter referred to and more particularly pointed out in the claims.

In the accompanying drawings which are made a part of this application, Figure 1 is a central longitudinal sectional view of the rack and running gear upon which the same is mounted, showing the movable portion of the rack in its normal position. Fig. 2 is a transverse vertical sectional view as seen on line 2—2, Fig. 1, and, Fig. 3 is a detail elevation of a tripping mechanism employed for connecting or disconnecting the driving mechanism with the running gears of the vehicle.

Referring to the drawings in which similar reference numerals designate corresponding parts throughout the several views, 1 and 2 indicate front and rear axles, respectively, of a running gear of a vehicle, said axles being provided with the usual or any preferred form of supporting wheels 3 and 4, respectively, the bolsters 5 of the running gear having mounted thereon a rack 6.

The rack is formed of side bars 7, which bars extend longitudinally of the running gear and rest on the bolsters 5, a plurality of cross bars 8 being mounted on said side bars on which is formed a platform 9. Extending along each edge of the platform 9 are flanges 10, between which is slidably mounted a frame 11, said frame being formed of cross strips 12, at the ends of which are standards 13, said standards having secured to their outer faces side and front bars 14, the front bars extending transversely of the rack, while the side bars extend longitudinally thereof. The frame 11 is adapted to be manually moved to the rear end of the rack and in order to properly guide the upper portion of the frame, standards 15 are extended upwardly from the rear end of the rack and have secured to their upper ends, side and end rails 16 and 17, the side rails extending substantially two-thirds the length of the rack and having their free ends introduced between the uppermost bar 14 and the next succeeding bar, the inner end of the upper bar 14 being preferably inclined to form a space of such width as to receive the side rail, said side rail passing from the outer face of the side standards and being held in position by placing straps 18 on the outer faces of the two upper bars 14.

The frame 11 is moved longitudinally of the platform 9 by means of a winding drum 19 and cables 20 and 21, the cable 20 extending to the forward end of the rack 6, where it is passed around a sheave 22 and has its end secured to the central cross strip 12 of the frame 11, while the cable 21 passes to the rear end of the rack and around a sheave 23 secured to the rear cross bar 8, the free end of said cable 21 being secured to the opposite side of the central cross strip 12 and it will be readily seen that when the shaft 24 on which the winding drum 19 is mounted, is rotated, the frame 11 will be moved longitudinally of the rack. The movement of the vehicle is employed for rotating the shaft 24 by attaching to the hub of one of the rear wheels 4 a sprocket 25, around which extends a chain 26, said chain also extending around a sprocket 27 on the shaft 24 and when the tongues 28 on the hub of the sprocket 27 are in engagement with the clutch 29 fixed to the shaft 24 and the vehicle is moved forwardly, the shaft 24 will be rotated and the frame 11 moved from the rear to the forward end of the rack. The sprocket 27 is slidably mounted on the shaft 24 so that the tongues 28 may be moved into or out of engagement with the clutch 29, whereby when the frame 11 has reached the forward end of the rack, the rotation of the shaft 24 may be stopped by moving the sprocket 27 away from the clutch. This result is more readily accomplished by securing to the inner face of one of the side bars 7, a bracket 30, on which is pivotally mounted a bell crank lever 31, to one arm of which is attached a link 32 having at its free end a spanner 33, which spanner 33 is adapted to enter a circumferential channel 34 in the hub of the sprocket 27 and it will be readily seen that as the bell crank lever 31 is rocked on its pivot, the sprocket 27 will be moved to and from the clutch 29. In order to hold the sprocket into or out of engagement with the clutch 29, a plunger 35 is secured to that arm of the bell crank lever opposite the arm to which the link is secured, the free end of the plunger being introduced through an ear 36 at the outer end of the bracket and on said plunger is a spring 37, said spring being so arranged as to exert tension on the bell crank lever at all times. The bell crank lever is so pivoted on the bracket that the end of the arm to which the plunger is secured, will rest at one side or the other of an axial line between the pivot point and the end of the plunger extending through the ear, so that the spring will always exert pressure on the bell crank lever and hold the same in its adjusted position.

A pitman 38 is secured to that end of the bell crank lever containing the plunger 35 and is extended to the forward end of the rack 6, where it is pivotally secured to a lever 39, the lower end of the lever being pivotally secured to one of the side bars 7, while to the upper end of the lever is secured a pull rope 40, the length of said pull rope being such as to extend from the lever to the forward end of the frame when said frame is in its rearward position, the free end of the pull rope being preferably entered through an eye 41 in the upper end of a standard 42 fixed to the forward end of the frame 11, the free end of the pull rope being held against leaving the eye in any suitable manner, as by securing a ring 43 to the end of the pull rope.

In operation, any suitable form of crank (not shown) is introduced onto the square end 44 of the shaft 24 and the frame 11 moved to the rear end of the rack, where said frame remains until it has been filled with hay or the like, said hay being deposited in the frame by means of a hay loader (not shown). As soon as the frame 11 has been filled, a pull is given the rope 40 and the lever 39 moved rearwardly, which action will swing the bell lever 31 on its pivot and move the sprocket 27 into engagement with the clutch 29 and as the vehicle moves forwardly, the shaft 24 will be rotated and the frame moved to the forward end of the rack through the medium of the drum and cables thereon and in order to automatically release the sprocket 27 from the clutch, a trip 45 is placed at the forward end of the frame 11 and in position to engage the lever 39, the forward movement of the frame 11 swinging the lever 39 forwardly and releasing the sprocket 27 from the clutch and it will be readily seen that as soon as that arm of the bell crank lever carrying the plunger 35 is moved beyond the dead center, the tension of the spring exerted against the bell crank lever will force the arm to which the plunger is attached against a stop 46 on the bracket 30. The hay loader then continues to deposit hay on the rack until that portion of the rack in the rear of the frame 11 is filled with hay. In this manner it will be readily seen that the rack may be filled with hay without necessitating the laborious task of manually moving the hay from the rear of the rack to the forward end thereof. It will further be seen that in view of the simplicity of the parts forming my improved rack, the same can be cheaply constructed and at the same time rendered strong and durable.

What I claim is:

1. A device of the character described, comprising a carrying frame, a slidable frame arranged thereon, actuating means for said slidable frame including a drum with its shaft supported upon the first referred to frame, said shaft having arranged thereon a slidable sleeve provided with a clutch face, a clutch member fixed to said shaft, a cable connected to said slidable frame and to said drum and engaged with intermediate pulleys supported upon said first referred to frame, a bell-crank having link connection with said slidable sleeve, a spring-pressed plunger connected with said bell-crank for holding the same in effective position, a lever having rod connection with said bell-crank and a line connection between said lever and said slidable frame, and a stop for limiting the movement of said bell-crank, said bell-crank having said plunger connected to one arm thereof, the spring of said plunger being adapted to deliver its pressure upon said bell-crank when said bell-crank has passed the dead center and to force said bell-crank against said stop.

2. A device of the character described, comprising a carrying frame, a slidable frame arranged upon said carrying frame, actuating means for said slidable frame including a drum with a shaft supported upon the first referred to frame, said shaft having arranged thereon a slidable sleeve provided with a clutch face, a clutch member fixed to said shaft, a cable connected to said slidable frame and to said drum and engaged by intermediate pulleys supported upon said first referred to frame, a link having connection with said slidable sleeve, a bell-crank having one arm connected to said link, a bracket having said bell-crank pivoted thereto, a plunger freely received at one end by one end of said bracket, the opposite end of said plunger being connected to the other arm of said bell-crank, a spring encompassing said plunger and interposed between said bell-crank and one end of said bracket, a stop projecting from said bracket, said spring being adapted to deliver its pressure upon said bell-crank when said bell-crank has passed the dead center and to force said bell-crank against said stop, said stop being adapted for engagement with and to limit the movement of said bell-crank.

In testimony whereof I have signed my name to this specification in the presence of two subscribing witnesses.

JURGEN JEPSEN.

Witnesses:
   F. J. MORLLER,
   MAX ROEH.